United States Patent [19]

Van Kampen et al.

[11] 4,390,900

[45] Jun. 28, 1983

[54] BIDIRECTIONAL INFORMATION TRANSMISSION VIA A LONG DISTANCE VIDEO INTERFACE (LDVI) CABLE

[75] Inventors: Hendrik Van Kampen; Joseph G. Rouland; Hendrik J. Baakman, all of Beekbergen, Netherlands

[73] Assignee: U.S. Philips Corporation, New York, N.Y.

[21] Appl. No.: 256,440

[22] Filed: Apr. 22, 1981

[30] Foreign Application Priority Data

Apr. 25, 1980 [NL] Netherlands ................... 8002412

[51] Int. Cl.³ .............................................. H04N 7/00
[52] U.S. Cl. ..................................... 358/147; 358/903; 364/514
[58] Field of Search ............... 358/141, 142, 146, 147, 358/903; 179/2 TV; 364/514

[56]      References Cited
        U.S. PATENT DOCUMENTS 3,982,064  9/1976  Barnaby ............................ 358/147

FOREIGN PATENT DOCUMENTS 1369463  10/1974  United Kingdom .

OTHER PUBLICATIONS

GEC Journal of Science & Technology, vol. 41, No. 4, 1974, pp. 117-124.

Primary Examiner—Robert L. Richardson
Attorney, Agent, or Firm—James J. Cannon, Jr.

[57]        ABSTRACT

Communication in two directions between a main station and a peripheral station of a data processing system via one and the same connection. One of the two communication directions has priority over the other direction. The way in which video pictures are composed is used as the communication means. Data characters are transmitted via the connection (cable) during the period during which no video signal may be present on the connection, i.e. during the blanking of the video picture after the generating of a vertical synchronization pulse.

4 Claims, 6 Drawing Figures

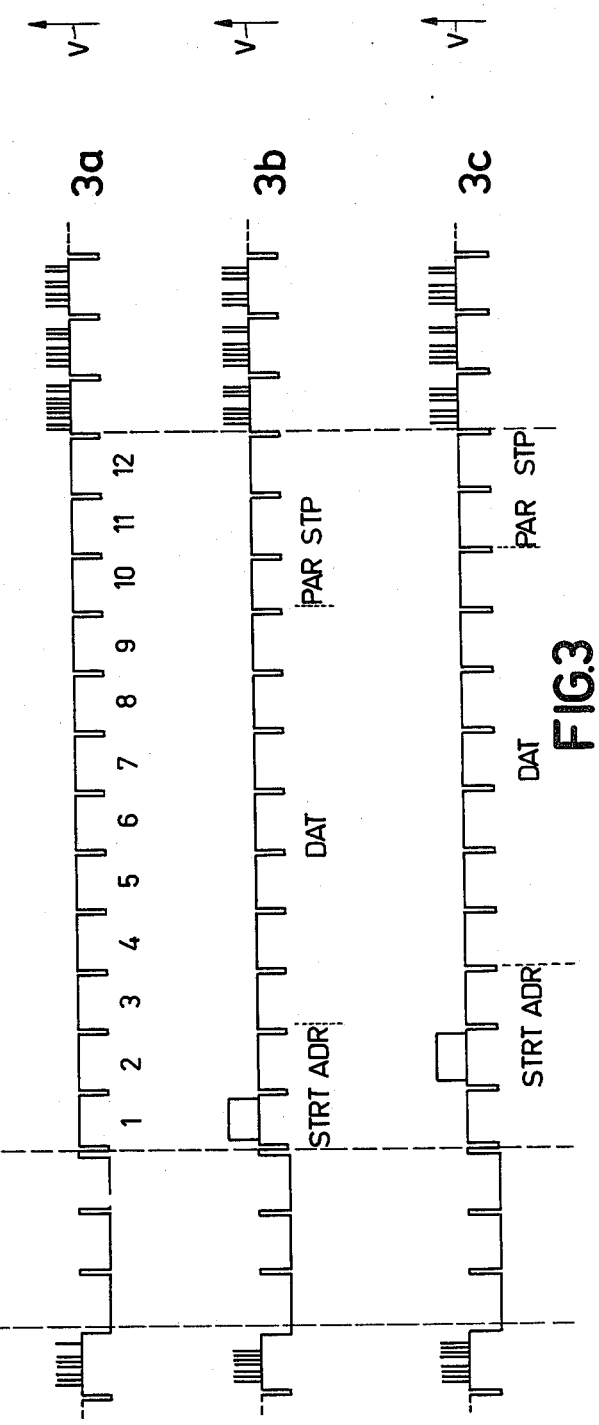

BIDIRECTIONAL INFORMATION TRANSMISSION VIA A LONG DISTANCE VIDEO INTERFACE (LDVI) CABLE

BACKGROUND OF THE INVENTION

The invention relates to a data processing system, comprising a main station (HS) and a peripheral station (PS) which are connected by a video line, the main station comprising a control unit with at least one processing unit, a memory, and a video control unit (VCU), the peripheral station comprising a video interface to which I/O apparatus is locally connected, an input of the video control unit being connected to the memory in order to form a composite video signal from the display information received for a video picture which is line-wise scanned, the VCU comprising first means for inserting data information from the memory into the composite video signal during at least one line duration during which the video picture has to be blanked, a video line (LDVI) which is connected on the one side to an output of said video control unit and on the other side to an input of the video interface, the peripheral station also comprising a display apparatus for a video picture which is line-wise scanned, said apparatus being connected to an output of said video interface, the video interface comprising second means for extracting said inserted data information from the composite video signal in order to make this data information available to a local data processing device which is also suitable for receiving further data information from the I/O apparatus present.

A system of this kind is known from the publication "Broadcast data in television", by A. J. Biggs and B. S. Barnaby, GEC Journal of Science and Technology, Vol. 41, No. 4, 1974, pages 117-124.

This article describes how data information can be added to television pictures by utilizing two picture lines during which the television picture is blanked. The data information in the form of a page consisting of 24 picture lines is stored in a memory of a transmitting station. This memory is cyclically read per data page and per television picture duration two lines of such a page are transmitted in a manner customarily used for television, said lines being stored in the local memory of the receiver device. This local memory is read per page, i.e. after 12 television picture durations. Such a memory in the receiver device substantially increases the price of the latter. The system is only suitable for receiving data information transmitted by the transmitting station.

SUMMARY OF THE INVENTION

A system according to the invention has for its object to realize a communication system between a computer and its peripheral equipment in a simple and attractive manner, without a local memory being present in the peripheral equipment, via one and the same connection line for picture as well as bidirectional transmission. The object in accordance with the invention is realized in that said second means are also suitable for applying said further data information to said video line and for inserting this further data information into the composite video signal during at least one line duration during a period which the picture has to be blanked, the video control unit comprising third means for extracting said further data information from the composite video signal in order to transfer said further data information to said memory.

Preferably, the blanking period after a vertical synchronization pulse is used, because it is comparatively longer than the blanking period during a horizontal synchronization pulse, thus offering the possibility of transmitting a complete character.

Preferably, only one bit is assigned to each said blanked picture line, because it is simple and adequate.

Preferably, the device is locally used; this means that said LDVI cable has a length of, for example, 100 m, because otherwise the risk of incorrect transmission of the data information would be simultaneously increased.

Preferably, the number of terminals having an I/O facility and forming part of the peripheral equipment is limited, for example, to four terminals.

The invention does not relate to the transmission of information via the customary telephone system.

The invention will be described in detail hereinafter with reference to some Figures.

BRIEF DESCRIPTION OF THE DRAWINGS

FIG. 2 shows a composite video signal;

FIG. 3a shows the composite video signal after a vertical synchronization pulse; FIG. 3b shows the procedure when data information is transmitted from the main station to the peripheral station, and FIG. 3c shows the transmission from the peripheral station to the main station;

DESCRIPTION OF THE PREFERRED EMBODIMENT

Figure 1:
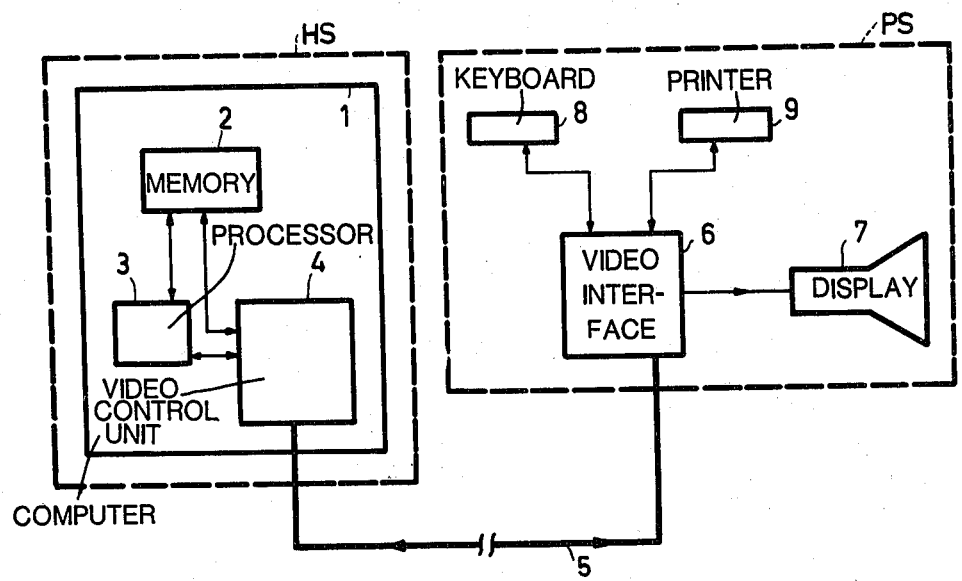
FIG. 1 shows a block diagram of a system device in which the invention is used.

FIG. 1 shows a block diagram of a system in which the invention is used. A main station (HS) comprises a computer (1) having a memory (2), a processor (3) and a video control unit (4) (VCU). A peripheral station (PS) comprises a video interface (6) to which there are connected a display unit with a cathode ray tube (7), a keyboard (8) and a printer (9), and possibly further peripheral equipment which is not shown in the Figure, such as a tape or punch card reader. This equipment, being locally connected to the video interface within the peripheral station, will be referred to hereinafter as peripheral equipment. An LDVI cable (5) connects the main station to the peripheral station and is connected to the one side to the VCU and on the other side to the video interface. An LDVI (Long Distance Video Interface) cable is an interface cable which is suitable for transmitting a high frequency signal over a comparatively long distance (approximately 100 m).

The VCU applies a composite video signal to the LDVI cable. This composite video signal consists of a video signal, i.e. video pictures with the associated horizontal and vertical synchronization pulses, and data information. These different components of the composite video signal can never be simultaneously transmitted via the LDVI cable, so that time distribution is necessary. The VCU is constructed so that it can also receive data information from the peripheral station in the assigned interval in order to transfer this information to the memory. The memory of the computer contains the complete information of the video picture, and also the data information, and possibly further information, for example, for the processor (3).

The memory is addressed in synchronism with the deflection of the electron beam on the cathode ray tube and the information is converted into a complete video signal by means of a character generator.

The video interface can process data information from the VCU; this coded information may be control information (for a keyboard or a printer) or information to be printed (for the printer). Furthermore, the video interface can transfer coded information from the peripheral equipment, for example, the data of a depressed key of the keyboard, to the main station in the appropriate time interval.

FIG. 2 shows a composite video signal. This signal comprises horizontal (10) and vertical (11) (VERT SYNC) synchronization pulses and also video information (12); no coded information has been inserted yet. Horizontal and vertical synchronization pulses have a different duration, a vertical synchronization pulse having a duration of three line durations. Between two horizontal synchronization pulses there is space for video information for one video line. Between two vertical synchronization pulses there is a complete picture. The composite video signal has three levels, i.e. synchronization level ($V_s$), black level ($V_z$) and white level ($V_w$), which are characterized by a difference in voltage level. A bit character may be assigned to two of these voltage levels. For example, logic "0" may be assigned to the black level $V_z$, and logic "1" to the white level $V_w$. A relationship is thus established between (data) bits and video information.

FIG. 3a again shows the composite video signal, emphasis being placed on the blanked lines after a vertical synchronization pulse. After such a vertical synchronization pulse, in this example the electron beam of the video display unit is blanked for 12 line durations. The available time is used for transmitting information between the computer and the peripheral station, transmission being possible in both directions. Because this information transmission is realized via one and the same fixed connection, i.e. the LDVI cable, a given procedure is followed which inter alia utilizes the relationship between (data) bits and video information. In this system priority is granted to the transmission direction from the VCU to the video interface.

FIG. 3b shows the procedure when data information is transferred from the VCU to the video interface. Using the data bit assigned to each blanked line, a given function is assigned to each data bit of such a line. The function "START BIT" (STRT) is assigned to the first line; the bit value determines the transmission direction. When the video control unit supplies a logic "1" on line 1, it is only permissible to transport data characters from the computer to the video interface. This "1" also forms the start bit for the transmission of information. Line 2 then contains the address (ADR) to which the information is to be transmitted; for example, "0" is the address of the keyboard and "1" is the address of the printer. The lines 3 to 9 contain the seven data bits (DAT) required for coding the 128 different characters or instructions (ASCII-code). Line 10 has the function of parity bit (PAR) and line 11 has the function "STOP BIT" (STP). The remaining line only has the logic zero. The assignment of a START and a STOP bit at the beginning and the end of the procedure relates to the fact that LSI circuits are used in the video interface.

FIG. 3c shows the procedure when coded information is transferred from the video interface to the computer via the LDVI cable. The distribution of the functions among the twelve blanked lines is different. The first line should necessarily be at the level "0" in order to allow the information to be transmitted access to the computer. Because a START and a STOP bit are again used as before, the function "START BIT" is assigned to the line 2. If information is to be transferred to the computer from the keyboard or the other peripheral equipment, the level "1" should be applied to the line 2. The line 3 then contains the address from which the transmission takes place. The lines 4 to 10 then contain the seven data bits, the line 11 the parity bit and the line 12, of course, the "STOP BIT".

Figure 4:
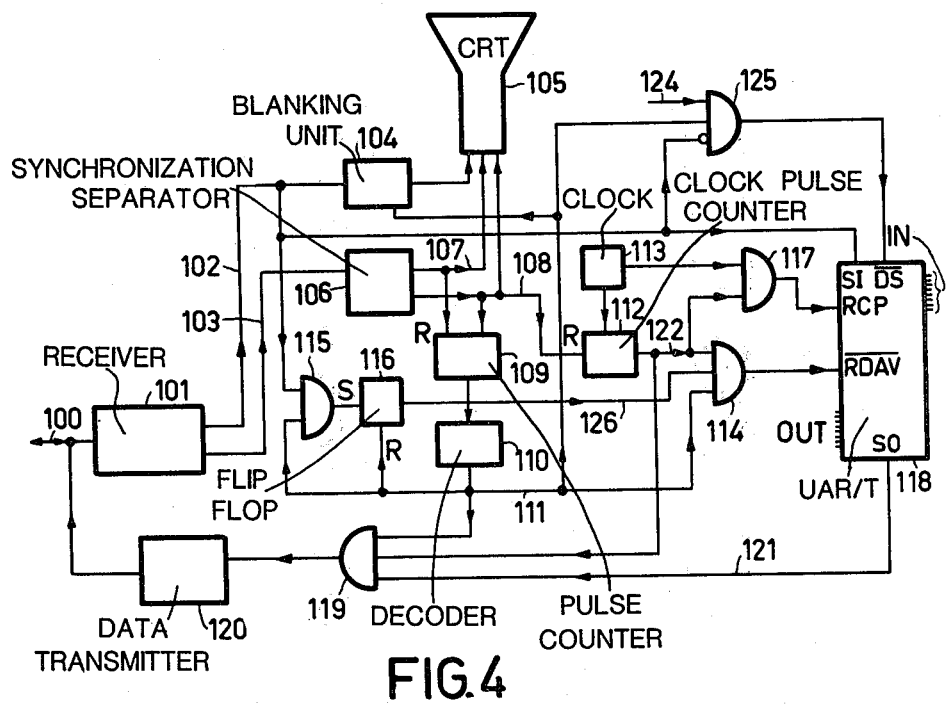
FIG. 4 shows a detailed diagram of a video interface.

FIG. 4 shows a detailed diagram of a video interface. It is composed of a receiver device (101) for receiving the composite video signal via the LDVI cable (100), a blanking unit (104) and a cathode ray tube device (105), a synchronization separator (106), a synchronization pulse counter (109), and a decoder (110) which process the information from the composite synchronization signal; a clock (113) and a clock pulse counter (112); five logic AND-gates (125), (117), (114), (115) and (119); an UAR/T element (118) (Universal Asynchronous Receiver/Transmitter) for processing data information; a data transmitter (120).

A composite video signal from the VCU of the computer enters the receiver device (101) via the LDVI cable (100). This composite video signal is separated in known manner into video+data signal (102) and composite synchronization signal (103). The synchronization separator (106) separates the composite synchronization signal in known manner into its horizontal and vertical components, and presents these components on the outputs in this form. The output for the horizontal (108) synchronization pulses and the output for the vertical (107) synchronization pulses are connected to the synchronization pulse counter (109) to which the decoder (110) is connected.

Directly, after a vertical synchronization pulse, the synchronization pulse counter (109) is reset and the decoder (110) applies a signal "1" to the logic gates 114, 115, 119 and 125 and activates the blanking unit (104). The decoder checks when the synchronization pulse counter has counted twelve horizontal synchronization pulses. As soon as this number is reached, the decoder applies a signal "0" to the connection line 111, with the result that the logic gates 114, 115, 119 and 125 are blocked, the blanking unit is deactivated and the flipflop (116) is reset. The blanking unit receives the video+data signal via the connecting line 102 and is active for the lines during which the electron beam of the display unit (105) has to be suppressed. The cathode ray tube device (105) is connected to the blanking unit, the output for vertical synchronization pulses (107) and horizontal synchronization pulses (108) of the synchronization separator (106) and displays the video signal from the VCU. The clock (113) has a frequency of at least sixteen times the frequency of the horizontal synchronization pulses. This clock is connected to a logic AND-gate (117) and to a (clock pulse) counter (112) which is also connected to the output for horizontal synchronization pulses (108). After each horizontal synchronization pulse, the counter is reset and supplies a signal "1" on the connection line 122. The counter (112) then counts sixteen clock pulses, after which it applies a signal "0" to the connection line 122. The connection line 122 is inter alia connected to the logic AND-gate 117, the other input of which is connected to the clock (113). The UAR/T (General Instrument AY-5-1013A) (118) in an L.S.I. (Large Scale Integration) subsystem which accepts binary characters originating from a terminal device (input IN) as well as from a computer (input SI) and which is capable of receiving as well as transmitting these characters. The received or transmitted characters comprise a start bit, eight data bits, one parity bit and one or two stop bits. A relationship can now be established with the functions assigned to the lines of FIGS. 3b and c. One bit of the series of eight data bits is chosen to act as the address bit, and only one of the two stop bits is used, as permitted by the UAR/T system. In the "start-stop bit" system of this LSI circuit, the rest condition corresponds to logic "1" and the operational condition to logic "0". Therefore, a valid start bit is a transition from logic "1" to logic "0". In order to make the logic level of the video line compatible with the operational level of the UAR/T, the bit value of the video line must be inverted. The system is adjusted to that an external clock pulse has to be applied (RCP) which has a frequency of sixteen times the bit rate of the received or transmitted characters; the clock (113) with the gate 117 satisfy this requirement. The system incorporates a test which consists in that the logic level is checked after eight clock pulses, i.e. halfway through the bit period.

The system furthermore incorporates fault detection by comparison of the stop and the parity bit received with the adjusted parity bit. The UAR/T system can process data bits with a maximum frequency of 40 Kbaud. Video information is transmitted at a frequency of 18,000 lines per second. Assignment of one data bit per blanked picture line is a suitable choice for this configuration. If no video signal is transmitted via the LDVI cable (100), i.e. during the blanked line durations, data information can be transmitted via the LDVI cable (100).

When data information is transported from the computer to the video interface, the bit value "1" is assigned to the first picture line blanked (FIG. 3b). This value is transported via the connection line 102 which is connected to the logic AND-gate 115. This gate (115) is connected to a flipflop (116). When a pulse is supplied on an output of the gate (115), the flipflop is set and a signal "1" is applied to the connection line (126). The connection line (126) is connected to the logic AND-gate 114. If all conditions have been satisfied (signal "1" on the connection lines 111, 126 and 122), the AND-gate 114 applies an enable signal to the UAR/T system RDAV, with the result that the input SI (serial input) is opened. The input SI is connected to the connection line 102. Eight data bits can then be serially clocked into the UAR/T system on the input SI. Because such functions have been assigned to the available blank lines that there was one address bit and seven data bits, the information can be transferred to the UAR/T in data characters in suitable form. These data bits are then available to the peripheral equipment in parallel on the output (OUT) of the UAR/T system. The UAR/T system is not only capable of receiving data characters from the computer, but it can also transfer data characters from the peripheral equipment to the computer. If data information has to be transferred from the peripheral equipment to the computer, the equipment should provide a "request signal" on line 124 on the input of the logic AND-gate 125, in order to indicate that data information originating from the peripheral equipment is present. The output signal of the decoder (connection line 111) is also connected to the gate 125, because data information may be transported only during the blanked line durations.

Furthermore, the gate (125) is connected to the connection line 102. If the bit value "0" is assigned to the first line blanked after a vertical synchronization pulse, the gate 115 is blocked and the gate 125 can supply a signal "1", of course, if both other described conditions (124 and 111) are satisfied. If the gate 125 supplies a signal "1", a signal is taken up on the input $\overline{DS}$ (Data Strobe) of the UART/T system, so that eight data bits are clocked in in parallel (IN). These bits are serially applied (SO) to the connection line which is connected to a logic AND-gate 119. This gate is furthermore connected to the decoder 110 via the connection line 111 and to the counter (112) (connection line 122). If all three conditions are satisfied (decoder supplies signal "1", ditto for the counter 112, and data available via the connection line 121), the data bits are transferred to the LDVI cable (100) via a data transmitter 120.

Figure 5:
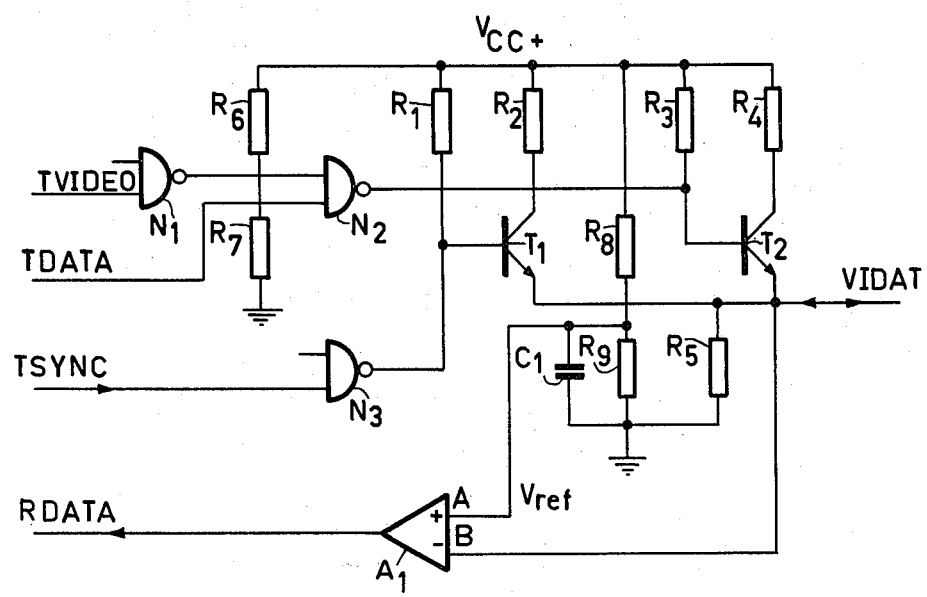
FIG. 5 shows a preferred embodiment of the part of the VCU which transfers the composite video signal to the LDVI cable.

FIG. 5 shows an embodiment of the part of the VCU which is suitable for transferring data + complete video signal to the LDVI cable and for receiving the data signal from the LDVI cable. For the transfer of the composite video signal, a distinction is made between on the one hand video information transmission and the transmission of data bits on the other hand.

For the transmission of video information it is necessary that the transmission line for data bits (TDATA) has the logic level TDATA = "1", because no data bits may be transmited while a video signal is being transmitted; the fact that the logic level is "1" relates to the described operational condition of the UAR/T system, which necessitates inversion of the data bits on the LDVI cable. When a synchronization pulse (TSYNC) (synchronization level $V_s$ of FIG. 2) is transmitted, the video signal (TVIDEO) must have the logic level TVIDEO = "0" and TSYNC = "1", because no video information may be transmitted during a horizontal synchronization pulse. Thus, TVIDEO = "1" is inhibited if TSYNC = "1". If TVIDEO = "0" and TSYNC = "1", both transistors T1 and T2 are cut-off and the output signal VIDAT = $V_s$ = 0 V. The transport of the black level $V_z$ is realized by TVIDEO = "0" and TSYNC = "0". In this case the transistor T1 is bottomed and the output voltage increases to $V_z$, so that VIDAT = $V_B$ = 0.7 V. The transport of the white level $V_w$ is realized by TVIDEO = "1" and TSYNC = "0". Both transistors are then bottomed and the output voltage inreases to $V_w$, so that VIDAT = $V_w$ = 2.25 V.

In order to transfer data bits from the VCU to the LDVI cable, TVIDEO must be "0", because data bits can be transmitted only if no video signal is being transmitted. Data bits may not be transmitted either when a synchronization pulse is being transmitted (TSYNC = "1"), so TDATA = "1" in this case. If TSYNC = "0", transistor T1 is bottomed, If TDATA = "0", transistor T2 is bottomed and VIDAT = $V_w$. VIDAT thus provides the inverse bit value of TDATA, said inversion being necessary for the UAR/T system. For the taking up of data bits, transmitted by the peripheral equipment, this circuit includes a differential amplifier $A_1$. Its negative input (B) is connected to the LDVI cable and receives the signal VIDAT. Its positive input (A) is connected to a reference voltage $V_{Ref}=1.3$ V. If the signal received $VIDAT=V_z$ ($<V_{Ref}$), the signal applied to the VCU is RDATA="1"; $VIDAT=V_W$ ($>R_{Ref}$), so RDATA="0". The signal RDATA, therefore, is the inverse of VIDAT, which is necessarily so because VIDAT has the inverse value of the despatched signal; the signal RDTA applied to the computer, therefore, has not been inverted (with respect to TDATA). The specifications of the parts are:

| | |
|---|---|
| $V_{cc} = 5$ V | $R_1 = 2.15$ k$\Omega$ |
| $N_1, N_2, N_3$: 74S38 | $R_2 = 316$ $\Omega$ |
| $A_1$: 75107 B | $R_3, R_4, R_5, R_9 = 121$ $\Omega$ |
| $T_1, T_2$: BSX 20 | $R_6 = 1$ k$\Omega$ |
| $C_1$: 22 nF | $R_7 = 1.21$ k$\Omega$ |
| | $R_8 = 332$ $\Omega$ |

Figure 6:
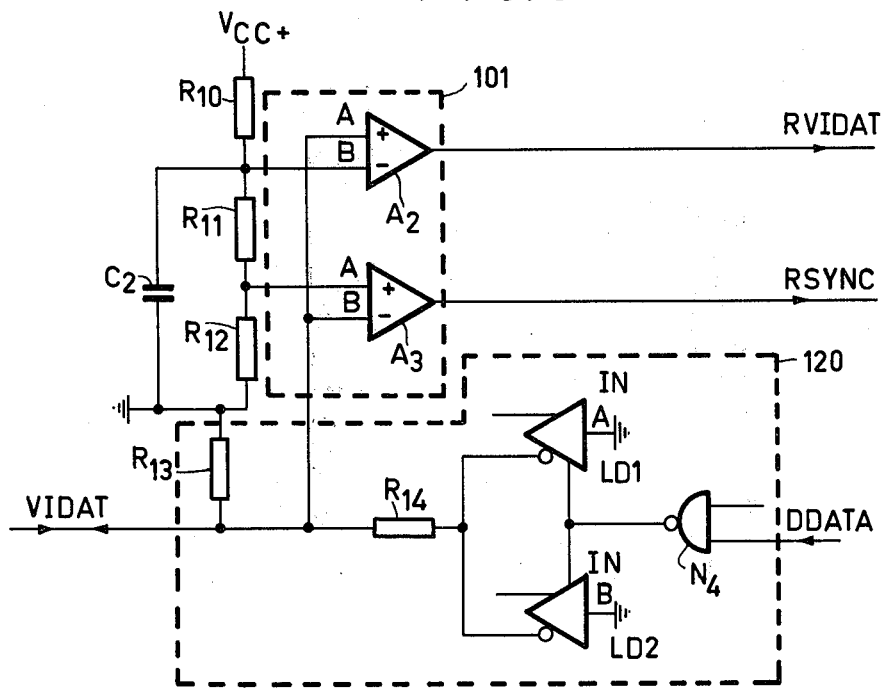
FIG. 6 shows a preferred embodiment of the receiver device and the data transmitter of the video interface.

FIG. 6 shows an embodiment of the receiver device (101) and the data transmitter (120) of FIG. 4. The data transmitter consists of two parallel connected line drivers LD1 and LD2 (MC 3468 Motorola), a resistor R 14 in series with the output, and a resistor R 13 which is connected between R 14 and ground. The gate N 4 is an inverting gate, so if DDATA="0" (DDATA is data originating from the peripheral equipment), $VIDAT=V_w$ and if DDATA="1", $VIDAT=V_z$; this means that the data on the LDVI cable (VIDAT) is the inverse of DDATA, which is also necessary in view of the operational condition of the UAR/T system. The receiver device for a composite video signal+data information consists of two differential amplifiers (A2 and A3) (75107B Texas Instruments) which are suitable for detecting $V_s$, $V_w$ and $V_z$.

If $VIDAT=V_s$, RSYNC="1" and RVIDAT="0"; if $VIDAT=Vz$, RSYNC="0" and RVIDAT="0"; if $VIDAT=Vw$, RSYNC="0" and RVIDAT="1", RSYNC representing the synchronization signal received and RVIDAT representing the video+data signal received.

The specifications of the remaining parts are:

| | |
|---|---|
| $V_{cc} = 5$ V | $R_{10} = 121$ $\Omega$ |
| $N_4$: 74LS38 | $R_{11} = 33.2$ $\Omega$ |
| $C_2$: 22 nF | $R_{12} = 10$ $\Omega$ |
| | $R_{13} = 82.5$ $\Omega$ |
| | $R_{14} = 14.1$ $\Omega$ |

We claim:

1. A data processing system, comprising a main station (HS) and a peripheral station (PS) which are connected by a video line, the main station comprising a control unit (1) with at least one processing unit (3), a memory (2), and a video control unit (VCU) (4), the peripheral station comprising a video interface (6) to which I/O apparatus (7, 8, 9) is locally connected, an input of the video control unit being connected to the memory in order to form a composite video signal from the display information received for a video picture which is line-wise scanned; the VCU comprising first means for inserting data information from the memory into the composite video signal during at least one line duration during which the video picture has to be blanked, a video line (LDVI) (5), which is connected on the one side to an output of the said video control unit and on the other side to an input of the video interface, the peripheral station also comprising a display apparatus for a video picture which is line-wise scanned, said display apparatus being connected to an output of said video interface, the video interface comprising second means for extracting said inserted data information from the composite video signal in order to make this data information available to a local data processing device which is also suitable for receiving further data information from the I/O apparatus present, characterized in that said second means are also suitable for applying said further data information to said video line and for inserting this further data information into the composite video signal during at least one line duration during a period which the picture has to be blanked, the video control unit comprising third means for extracting said further data information from the composite video signal in order to transfer said further data information to said memory.

2. A device as claimed in claim 1, characterized in that only one bit is assigned per line duration during the period for which the video picture has to be blanked.

3. A device as claimed in claim 1 or 2, characterized in that the bit value of the first bit assigned by said first means to the first picture line blanked after a vertical synchronization pulse determines the direction in which data information is transported, a bit assigned to one blanked picture line being an address bit.

4. A device as claimed in claim 1 or 2, characterized in that the bit assigned to the second blanked picture line by said second means is a start bit, the bit assigned to the first blanked picture line being the bit assigned by the first means.

* * * * *